United States Patent [19]

Cucelli et al.

[11] 4,399,987
[45] Aug. 23, 1983

[54] RESILIENT SUPPORT DEVICE

[75] Inventors: Andrea Cucelli, Milan; Gustavo Brizzolesi, Trezzano sul Naviglio; Emilio Bossi, Gragnano, all of Italy

[73] Assignee: S.A.G.A. Societa' Applicazioni Gomma Antivibranti S.p.A., Milan, Italy

[21] Appl. No.: 279,420

[22] Filed: Jul. 1, 1981

[30] Foreign Application Priority Data

Jul. 4, 1980 [IT] Italy ............................ 23275 A/80

[51] Int. Cl.³ .............................................. F16F 15/00
[52] U.S. Cl. .................................. 267/140.1; 267/35; 267/141.3; 248/562
[58] Field of Search ............... 248/562, 565, 636, 638; 188/298; 267/63 R, 75, 64.23, 64.24, 113, 120, 122, 140, 140.1, 141.1, 141.2, 141.3, 141.7, 153, 64.15, 8 R, 35

[56] References Cited

U.S. PATENT DOCUMENTS

| 2,380,899 | 7/1945 | Strachovsky | 267/140.1 |
| 2,387,065 | 10/1945 | Harding | 188/298 |
| 2,387,066 | 10/1945 | Harding | 188/298 |
| 3,368,807 | 2/1968 | Thrasher | 267/35 |
| 3,658,314 | 4/1972 | Luzsicza | 248/562 |
| 3,897,856 | 8/1975 | Pineau | 267/35 |
| 4,161,304 | 7/1979 | Brenner et al. | 248/562 |
| 4,199,128 | 4/1980 | van den Boom et al. | 267/140.1 |

FOREIGN PATENT DOCUMENTS

| 2906282 | 8/1980 | Fed. Rep. of Germany | 248/562 |
| 1423391 | 11/1966 | France | 267/141.3 |

Primary Examiner—Douglas C. Butler
Assistant Examiner—R. R. Diefendorf
Attorney, Agent, or Firm—Sughrue, Mion, Zinn, Macpeak and Seas

[57] ABSTRACT

A resilient support device for mounting an oscillating body on a support structure comprises a tubular support body having an internal chamber which is filled with a damping liquid and defined at one end by a base of the tubular support body and at the other end by an annular elastomeric diaphragm. The outer surface of the diaphragm is fixed to the tubular support body and its inner surface is connected to a shank which is carried by an attachment member connected coaxially to the tubular support body by an annular elastomeric element. At its inner end, the shank has a transverse disk which is immersed in the damping liquid.

4 Claims, 2 Drawing Figures

RESILIENT SUPPORT DEVICE

BACKGROUND OF THE INVENTION

The present invention relates, in general, to resilient support devices for mounting oscillating bodies on support structures, and is particularly concerned with a damped resilient support device of the type including a tubular support body for fixing to the support structure, an attachment member which is attachable to the oscillating body and is connected coaxially to one end of the tubular support body by an annular elastomeric element the outer surface of which is fixed to the tubular support body and the inner surface of which is fixed to the attachment member, and a fluid-dynamic damper for damping oscillations of the attachment member relative to the tubular support body.

OBJECT OF THE INVENTION

The object of the present invention is to provide a resilient support device of the aforesaid type in which the fluid-dynamic damper comes into operation only when the amplitude of the vibrations of the oscillating body exceeds a given value, so as to achieve simultaneously a high flexibility and a high degree of damping for low-frequency oscillations, and a low degree of damping accompanied by much-reduced transmission of high frequency oscillations.

SUMMARY OF THE INVENTION

Accordingly, the present invention provides a resilient support device of the aforesaid type having a combination of the following characteristics:

the tubular support body has a rigid transverse wall at its end opposite the attachment member, the attachment member has a shank which extends coaxially in the tubular support body and carries a transverse disk at its inner end, and an annular elastomeric diaphragm is interposed between the attachment member and the transverse disk, being coaxial with the tubular support body and axially spaced from the annular elastomeric element, the inner surface of the annular member being fixed to the shank of the attachment member and its outer surface being fixed to the tubular support body, the elastomeric diaphragm defining with the transverse wall of the tubular support body a chamber within the tubular support body which is filled with a damping liquid in which the transverse disk is immersed.

As a result of these characteristics, the support device has a limited damping effect on small amplitude oscillations, which are completely absorbed by elastic deformations of the annular elastomeric element connecting the attachment member to the support body, while, in the case of low-frequency or high amplitude oscillations, the displacement of the transverse disk carried by the attachment member within the fluid-filled chamber provides a powerful viscous-damping action. Since the damping liquid is not in contact with the annular elastomeric element connecting the attachment member to the tubular support body, there are no changes in the rigidity of the annular element resulting from variations in pressure within the chamber. This renders the dynamic behavior of the annular elastomeric element independent of variations in the dynamic pressure of the damping liquid, reducing its dynamic reaction and hence the transmissibility, particularly in the case of high frequency oscillations. Moreover, owing to the presence of the annular elastomeric diaphragm, the annular elastomeric element need not ensure a fluid-tight seal and may therefore be shaped in any form, and may have apertures, according to the applicational requirements of the support.

Furthermore, the fluid-dynamic damper of the support device is not subject to the internal pressure of the fluid, due to the deformation under static load of the annular elastomeric element which connects the attachment member to the tubular support body, and hence the annular elastomeric diaphragm functions only in the presence of dynamic loads.

According to the invention, the elastomeric diaphragm has a circumferential concavity which projects into the inner chamber in its undeformed rest condition.

Due to its specific damping characteristics, the resilient support device according to the invention may be used to advantage in mounting an engine from the chassis of a motor vehicle. The support allows the efficient damping of oscillations arising from the engine under slow-running conditions or from sudden jolts of the vehicle caused by irregular ground, while the damping is much-reduced during fast-running so as to isolate the engine from the chassis and ensure a comfortable ride.

BRIEF DESCRIPTION OF THE DRAWINGS

Further characteristics and advantages of the invention will become clear from the following detailed description which is provided, by way of example, with reference to the accompanying drawings, in which.

DETAILED DESCRIPTION OF A PREFERRED EMBODIMENT

Figure 1:
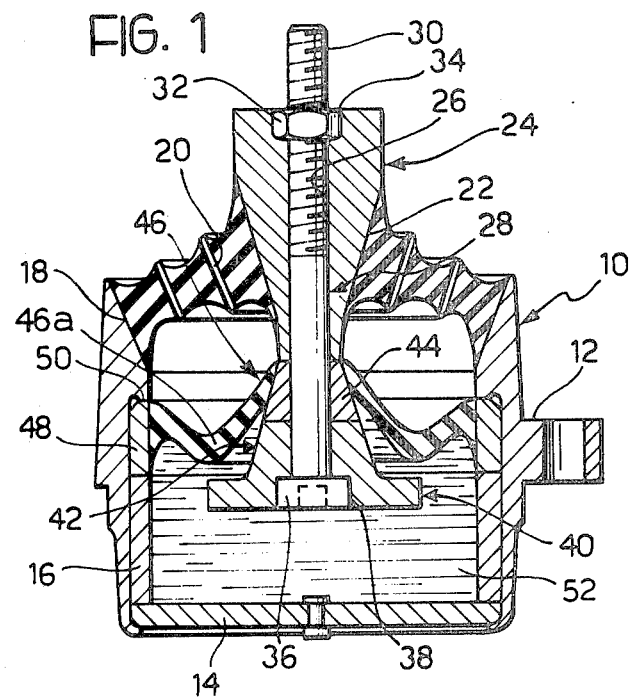
FIG. 1 is an axial sectional view of a resilient support device according to the invention in an undeformed rest condition, that is, before installation.

With reference to the drawings, a tubular metal support body 10 is provided with a plurality of lateral lugs 12, one of which is shown, having holes for fixing the body 10 to a support structure.

The support body 10 is provided at one end with a rigid transverse base 14 which is clamped against a sleeve 16 lying close against an internal surface of the body 10 by swaging of the end of the body 10.

At its other end the tubular support body 10 has an annular, internal, flared surface portion 18 to which is fixed the outer surface of a substantially bell-shaped annular elastomeric element 20. The inner surface of the annular element 20 is fixed to a frusto-conical surface of a central portion 22 of a metal attachment member 24 which is coaxial with the support body 10. The attachment member 24 has an axial hole 26 in which a metal shank 28 is inserted. The shank 28 has a screw-threaded end 30 which, being screwed into a nut 32 housed in a recess at one end 34 of the attachment member 24, projects beyond the attachment member 24 to allow the member 24 to be fixed to an oscillating body. The opposite end of the shank 28 extends into the support body 10 and has a head end 36 housed in an axial cavity 38 in a transverse disk 40. On its side facing the attachment member 24, the transverse disk 40 has a frusto-conical spigot 42 the smaller face of which bears against the larger face of a tubular spacer element 44 which has an external frusto-conical surface and is mounted on the shank 28. The smaller face of the spacer element 44 bears against the inner end of the attachment member 24.

To the outer surface of the spacer element 44 there is fixed an annular elastomeric diaphragm 46 which is coaxial with the tubular support body 10 and spaced axially from the annular elastomeric element 20. The outer surface of the annular elastomeric diaphragm 46 is fixed to a metal ring 48 which is adjacent the inner surface of the support body 10 and is locked axially between the sleeve 16 and an inner annular shoulder 50 of the support body 10. The annular elastomeric diaphragm 46 and the base 14 together define a closed chamber 52 within the tubular support body 10, which is completely filled with a high-viscosity damping liquid in which the transverse disk 40 is immersed.

The configuration of the support device of the invention shown in FIG. 1 corresponds to an undeformed rest condition, that is, before installation of the support. In this condition, the annular elastomeric diaphragm 46 has a circumferential concavity 46a projecting into the chamber 52. In the operational configuration of the support, shown in FIG. 2, which corresponds to the case where the support body 10 is fixed to a support structure and the attachment member 24 is connected to an oscillating body, the elastic yielding of the annular elastomeric element 20 under the static load of the oscillating body, and the accompanying axial lowering of the shank 28, cause the elastomeric diaphragm 46 to adopt a substantially flattened configuration.

Figure 2:
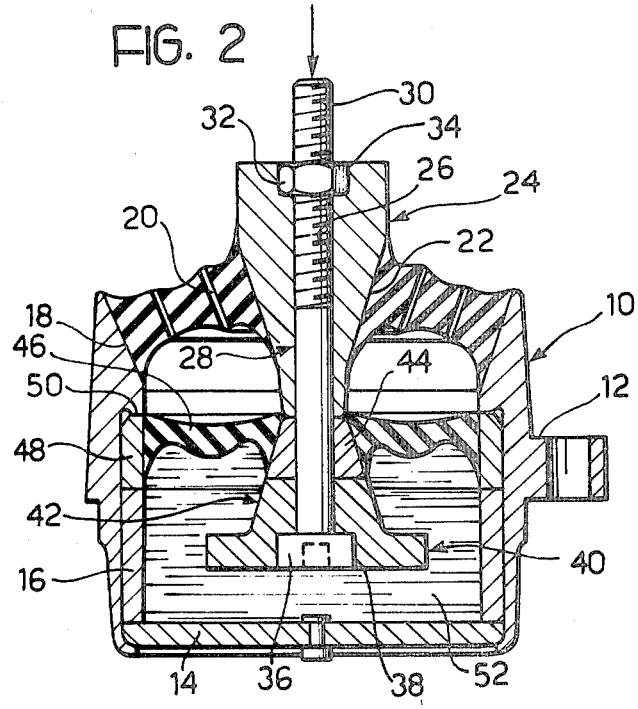
FIG. 2 is a view similar to FIG. 1 showing the device in its mounted condition under static load.

Upon assembly of the resilient support according to the invention and before filling with damping liquid, an initial deformation of the annular elastomeric element 20, from the rest configuration shown in FIG. 1 to that of yielding under static load shown in FIG. 2, is effected by means of an external assembly tool (not shown), which also clamps axially the attachment member 24, the spacer element 44, and the transverse disk 40 by the screw-threaded part 30 of the shank 28 and the nut 32. Subsequently, the chamber 52 is completely filled with the damping liquid, and liquid-tight closure of this chamber 52 is effected by applying the base 14 and clamping it by swaging. When the assembly tool is released, the annular elastomeric element 20 tends to return axially to its undeformed condition, taking the inner part of the annular elastomeric diaphragm 46 with it. After release, the support has the configuration shown in FIG. 1. When the support is loaded, in its condition of use, it re-adopts the configuration of FIG. 2, which had been achieved by the assembly tool.

In use, the resilient support device according to the invention is able to effect a powerful damping action on high amplitude oscillations of the oscillating body and a much-reduced damping action on low amplitude oscillations. In the first case, the elastic deformation of the annular elastomeric element 20 is accompanied by a change in the volume of the chamber 52, which is absorbed initially by elastic deformation of the annular elastomeric diaphragm 46. Subsequently, the diaphragm 46 behaves as an inelastic element and further stress simply causes damping liquid to pass from one part of the chamber 52 to the other, through the annular passage between the lateral edge of the transverse disk 40 and the internal surface of the support body 10, resulting in viscous damping.

On the other hand, when the oscillations are of small amplitude, such that the variations in the volume of the chamber 52 are completely absorbed by the elastic deformations of the annular diaphragm 46, there is negligible flow of damping liquid between the two parts of the chamber 52 and hence viscous damping is insignificant.

Naturally, it is possible to vary the amount of viscous damping obtainable by varying the size of the transverse disk 40 relative to the chamber 52.

Since the damping liquid is not in contact with the annular elastomeric element 20, the elasticity of the latter is not affected by the pressure which is established in the chamber 52, and the dynamic behaviour of the annular elastomeric element 20 is independent of the variations in dynamic pressure within the chamber 52. As a result the dynamic reaction of the element 20, and hence the transmissibility of vibrations by this annular element 20, is reduced, particularly at high frequency. Moreover, since it is not necessary for the annular elastomeric element 20 to ensure a fluid-tight seal, it may be shaped in any form and, furthermore, may have apertures according to the operational requirements of the support.

Naturally, while the principle of the invention remains the same, the details of construction and embodiment may be varied widely from that described and illustrated, without departing from the scope of the present invention.

What is claimed is:

1. A resilient support device for mounting an oscillating body on a support structure, of the type including:
   a tubular support body fixable to the support structure;
   an attachment member attachable to an oscilliating body and connected coaxially to one end of the tubular support body;
   an annular elastomeric element having its outer surface fixed to the tubular support body and its inner surface fixed to the attachment member to connect the latter to said one end of the support body, and
   a fluid-dynamic damper for damping oscillations of the attachment member relative to the tubular support body, wherein the improvement consists in:
   a rigid transverse wall being provided at the opposite end of the tubular support body to the attachment member;
   a shank being provided on the attachment member, and extending coaxially in the tubular support body,
   a transverse disk being carried at the inner end of said shank, and
   an annular elastomeric diaphragm interposed between the attachment member and the transverse disk so as to be coaxial with the tubular support body and axially spaced from said annular elastomeric element, said diaphragm being connected at its inner surface to said shank and at its outer surface to the tubular support body, a first chamber being defined between said diaphragm and said transverse wall of the tubular support body, and a second chamber being defined between said diaphragm and the annular elastic element, said first chamber being filled with a damping liquid in which the transverse disk is immersed and sealed with respect to said second chamber.

2. A resilient support device as defined in claim 1, wherein said diaphragm defines, in its undeformed rest condition, a circumferential concavity which projects into said chamber.

3. A resilient support device as defined in claim 1, wherein the shank of the attachment member has a screw-threaded portion which projects from the support for fixing said attachment member to an oscillating body.

4. A resilient support device as defined in claim 1, wherein a tubular spacing element having one end face larger than the other is fitted to the shank of the attachment member, said spacing element having an outer frusto-conical surface to which the inner surface of said annular diaphragm is fixed, the larger end face of said spacer element bearing against the transverse disk and the smaller end face of said spacer element bearing against the attachment member.

* * * * *